United States Patent
Kimura (10) Patent No.: US 9,207,878 B2
(45) Date of Patent: Dec. 8, 2015

(54) INFORMATION PROCESSING APPARATUS (71) Applicant: FUJITSU LIMITED, Kawasaki-shi (JP)

(72) Inventor: Masatoshi Kimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 187 days.

(21) Appl. No.: 13/860,237

(22) Filed: Apr. 10, 2013

(65) Prior Publication Data

US 2013/0304989 A1 Nov. 14, 2013

(30) Foreign Application Priority Data

May 8, 2012 (JP) ................................. 2012-107129

(51) Int. Cl.
*G06F 3/06* (2006.01)
*G06F 13/00* (2006.01)
*G06K 19/00* (2006.01)
*G06F 9/44* (2006.01)
*G06F 17/30* (2006.01)
*H04W 88/00* (2009.01)

(52) U.S. Cl.
CPC ............ *G06F 3/0679* (2013.01); *G06F 9/4411* (2013.01); *G06F 13/00* (2013.01); *G06F 17/30* (2013.01); *G06K 19/00* (2013.01); *H04W 88/00* (2013.01)

(58) Field of Classification Search
CPC ......... G06F 13/00; G06F 3/0679; G06F 9/00; G06K 19/00
See application file for complete search history.

(56) References Cited

U.S. PATENT DOCUMENTS

| 6,762,791 | B1 * | 7/2004 | Schuetzle ................. 348/231.3 |
| 7,426,401 | B2 * | 9/2008 | Nago .............................. 455/557 |
| 2004/0196375 | A1 * | 10/2004 | Marshall .................... 348/207.1 |
| 2004/0212735 | A1 * | 10/2004 | Kitamura ...................... 348/553 |
| 2005/0001024 | A1 * | 1/2005 | Kusaka et al. ................ 235/375 |
| 2006/0039221 | A1 | 2/2006 | Fukuda |
| 2007/0110035 | A1 * | 5/2007 | Bennett ......................... 370/352 |
| 2007/0195098 | A1 * | 8/2007 | Hirose et al. .................. 345/473 |
| 2010/0079599 | A1 * | 4/2010 | Kanma ........................ 348/207.1 |
| 2010/0223412 | A1 * | 9/2010 | Jung .............................. 710/301 |

(Continued)

FOREIGN PATENT DOCUMENTS

| CN | 1770768 | 5/2006 |
| CN | 101715037 | 5/2010 |

(Continued)

OTHER PUBLICATIONS

Korean Office Action mailed Apr. 29, 2014 for corresponding Korean Patent Application 10-2013-0046005, with English Translation, 8 pages.

Sutapa Saito, "SD memory card! Photo transfer using wireless LAN", p. 1, line 1-line 12 (partial English translation). Online Date: Jan. 5, 2009; Search Date: Apr. 16, 2012 <URL:http://k-tai.impress.co.jp/cda/artide/stapa/43417.html>.

(Continued)

*Primary Examiner* — Yaima Rigol
*Assistant Examiner* — Tasnima Matin
(74) *Attorney, Agent, or Firm* — Fujitsu Patent Center (57) ABSTRACT

When a link unit detects a built-in WLAN memory card by using wireless communication, the link unit determines whether there is a match between the SSID of the detected built-in WLAN memory card and the SSID of the built-in WLAN memory card that is inserted into the PC. If the SSIDs match, it means the built-in WLAN memory card that has been detected using wireless communication is the built-in WLAN memory card that is inserted into the PC and the link unit consequently performs a control such that the WLAN unit does not acquire still images nor moving images.

5 Claims, 7 Drawing Sheets

(56) References Cited

U.S. PATENT DOCUMENTS

| | | | |
|---|---|---|---|
| 2012/0162401 A1* | 6/2012 | Melder et al. | 348/65 |
| 2012/0288252 A1* | 11/2012 | Iwashita | 386/224 |
| 2012/0311090 A1* | 12/2012 | Locker et al. | 709/218 |
| 2013/0120592 A1* | 5/2013 | Bednarczyk et al. | 348/207.1 |
| 2013/0204939 A1* | 8/2013 | Yajima et al. | 709/204 |

FOREIGN PATENT DOCUMENTS

| | | |
|---|---|---|
| KR | 10-2007-0006536 A | 1/2007 |
| KR | 10-2011-0135271 A | 12/2011 |

OTHER PUBLICATIONS

Sutapa Saito, "Eye-Fi X2 (With Direct Mode)!!", p. 1, line 20-line 28 and p. 3, line 16-line 23 (partial English translation). Online Date: Apr. 25, 2011; Search Date: Apr. 16, 2012 <URL:http://k-tai.impress.co.jp/docs/column/stapa/20110425_442155.html>.

Sutapa Saito, "Wireless LAN-enabled digital camera FlashAir ♪", p. 1, line 1-line 11 (partial English translation). Online Date: Apr. 9, 2012; Search Date: Apr. 16, 2012 <URL:http://k-tai.impress.co.jp/docs/column/stapa/20120409_525089.html>.

CNOA—Office Action of Chinese Patent Application No. 201310149018.3 mailed Sep. 11, 2015, with English translation.

* cited by examiner

FIG.2

(a) MANAGEMENT METHOD OF STILL IMAGE DATA IN MEMORY CARD (b) MANAGEMENT METHOD OF STILL IMAGE DATA IN PC

INFORMATION PROCESSING APPARATUS

CROSS-REFERENCE TO RELATED APPLICATION(S)

This application is based upon and claims the benefit of priority of the prior Japanese Patent Application No. 2012-107129, filed on May 8, 2012, the entire contents of which are incorporated herein by reference.

FIELD

The embodiment discussed herein is directed to a link program and an information processing apparatus.

BACKGROUND

In recent years, memory cards having a built-in access point (AP) and a built-in station (STA) for a wireless LAN have become available. (Such memory cards are hereinafter referred to as "built-in WLAN memory cards"). It is possible for a user to register a built-in WLAN memory card, which has a built-in wireless LAN function, in a personal computer (hereinafter, referred to as a "PC") or a smart phone, and then to set up the automatic acquisition of still images and moving images. Consequently, the still images and moving images that are captured by a digital camera into which the registered built-in WLAN memory card is inserted are automatically acquired by a PC or a smart phone.

Furthermore, with a memory card that has a unique Web server function in addition to the wireless LAN function, a user boots up a web browser by using a PC or a smart phone and specifies a memory card via an URL; thereby, a folder or a file in the memory card can be displayed.

Non-Patent Document 1: "SD memory card! Photo transfer using wireless LAN", [searched on Apr. 16, 2012], Internet <URL:http://k-tai.impress.co.jp/cda/article/stapa/43417.html Non-Patent Document 2: "Eye-Fi X2 (With Direct Mode)!!", [searched on Apr. 16, 2012], Internet <URL:http://k-tai.impress.co.jp/docs/column/stapa/20110425_442155.html Non-Patent Document 3: "Wireless LAN-enabled digital camera FlashAir ♪", [searched on Apr. 16, 2012], Internet <URL:http://k-tai.impress.co.jp/docs/column/stapa/20120409_525089.html However, if an application (hereinafter, referred to as an "acquisition application") that acquires still images and moving images from a memory card is installed in a PC, there is a problem in that the still images and the moving images in the built-in WLAN memory card are acquired twice.

Specifically, if a memory card that contains therein a specific folder is inserted into the memory card slot of a PC, an acquisition application is booted up and then the still images and moving images in the memory card are acquired by the PC. Furthermore, if a memory card having a built-in AP is inserted into a PC, power is supplied to the memory card and then the AP is booted up. Furthermore, if the automatic acquisition of still images and moving images is set, the still images and moving images in the memory card are acquired by the PC by using a wireless LAN function. In other words, the still images and moving images in the built-in WLAN memory card are acquired twice: once by the acquisition application and once due to the wireless LAN function.

SUMMARY

According to an aspect of an embodiment, a computer readable storage medium having stored therein a link program causing a computer to execute a process including: determining, when a storage device having a built-in wireless communication function has been detected by using wireless communication, whether the storage device having the built-in wireless communication function booted up due to the computer starting to supply power has been detected; and controlling, when it is determined at the determining that the storage device, in which the built-in wireless communication function is booted up due to the computer starting to supply power, has been detected, such that data in the storage device is not acquired using wireless communication.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiments of the present invention will be explained with reference to accompanying drawings. The present invention is not limited to the embodiment.

Figure 1:
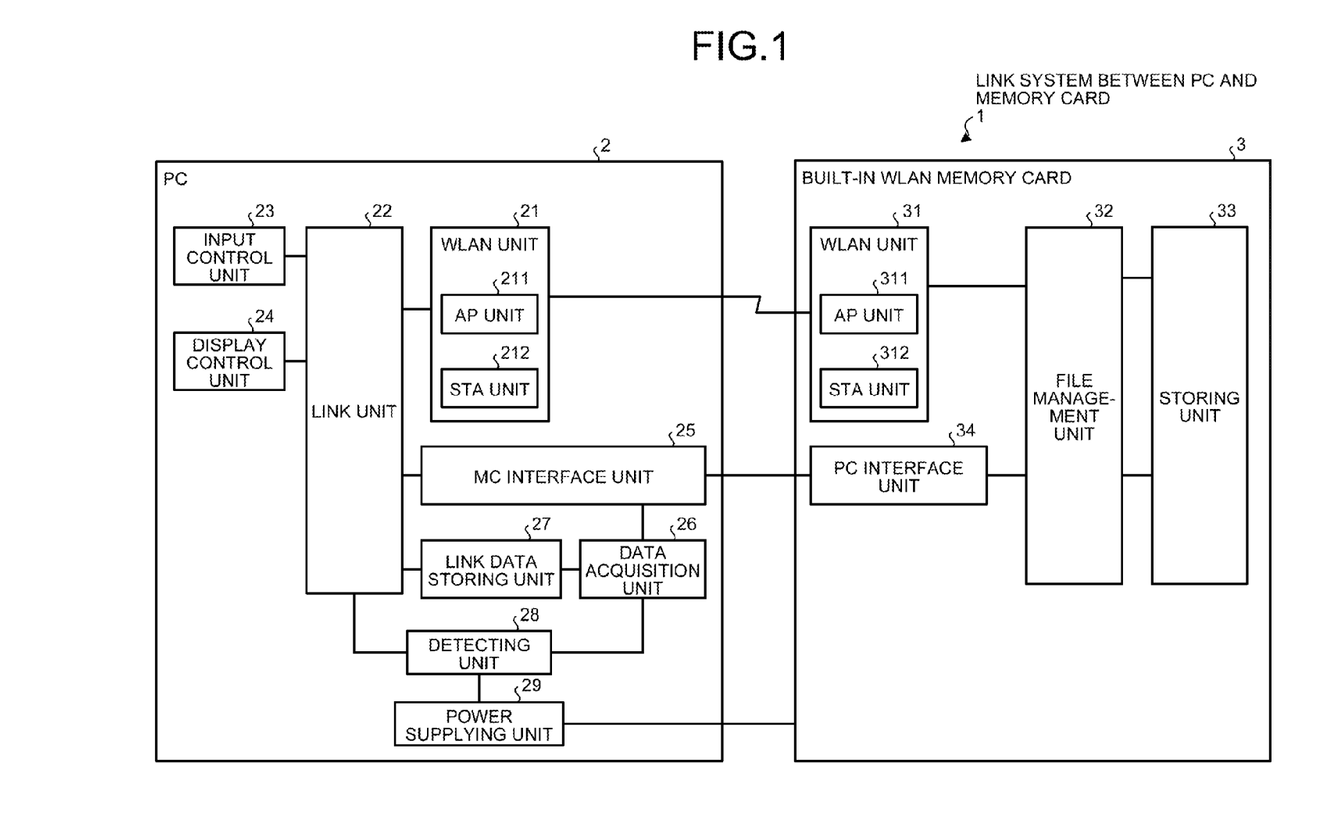
FIG. 1 is a functional block diagram illustrating the configuration of a link system between a PC and a memory card according to an embodiment.

First, a link system between a PC and a memory card according to an embodiment will be described. FIG. 1 is a functional block diagram illustrating the configuration of a link system between a PC and a memory card according to an embodiment. As illustrated in FIG. 1, a link system between a PC and a memory card 1 includes a PC 2 and a built-in WLAN memory card 3 and executes a link between the PC 2 and the built-in WLAN memory card 3. The "link" mentioned here means that still images and moving images stored in a memory card, such as the built-in WLAN memory card 3, are acquired by the PC 2.

The PC 2 includes a WLAN unit 21, a link unit 22, an input control unit 23, a display control unit 24, an MC interface unit 25, a data acquisition unit 26, a link data storing unit 27, a detecting unit 28, and a power supplying unit 29.

The WLAN unit 21 communicates by using a wireless LAN. In the embodiment, the WLAN unit 21 communicates with a WLAN unit 31 in the built-in WLAN memory card 3.

The WLAN unit 21 includes an AP unit 211 that allows the WLAN unit 21 to function as an access point for wireless LAN communication and also includes an STA unit 212 that allows the WLAN unit 21 to function as a station (client machine) for wireless LAN communication.

The link unit 22 links with another information communication device by using the WLAN unit 21 or the MC interface unit 25. In the embodiment, the link unit 22 links with the built-in WLAN memory card 3. The link unit 22 will be described in detail later.

The input control unit 23 receives data that is input by a user using an input device, such as a mouse or a keyboard, and transfers the received data to the link unit 22. The display control unit 24 displays the data that is output from the link unit 22 on a display.

The MC interface unit 25 is an interface that performs wired communication with a PC interface unit 34 in a memory card when the memory card, such as the built-in WLAN memory card 3, is inserted into the PC 2.

The data acquisition unit 26 is an acquisition application that is booted up when a memory card that has a specific folder containing therein still image data and moving image data is inserted into in the PC 2 and that acquires the still image data and moving image data by using the MC interface unit 25.

Figure 2:
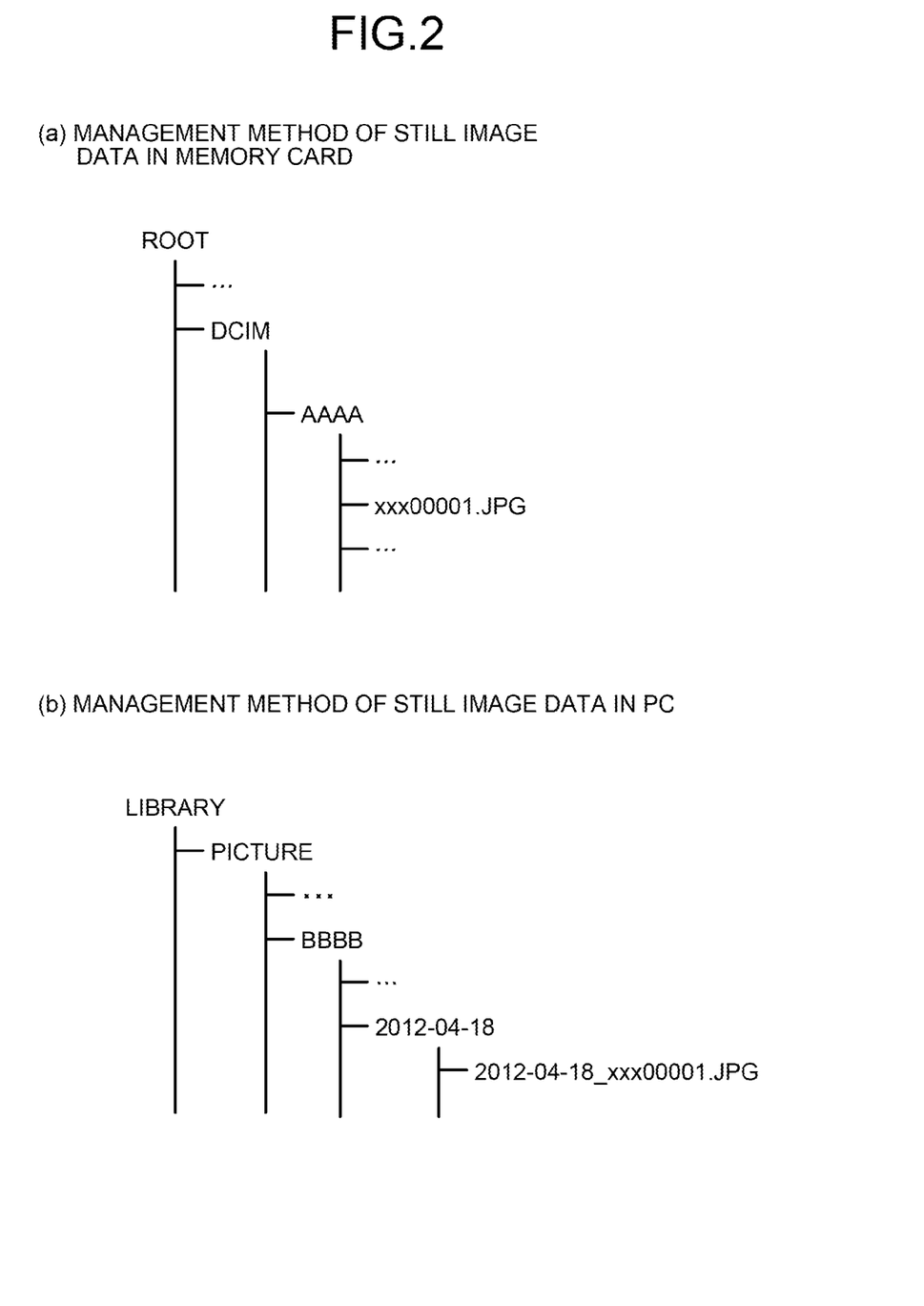
FIG. 2 is a schematic diagram illustrating a management method of still image data that is acquired from a memory card.

The link data storing unit 27 is a storing unit that stores therein the still image and moving image data acquired from the memory card. FIG. 2 is a schematic diagram illustrating a management method of still image data that is acquired from a memory card. In (a) of FIG. 2, a management method of still image data in a memory card is illustrated. In (b) of FIG. 2, a management method of still image data in the PC 2 is illustrated.

As illustrated in (a) of FIG. 2, in the memory card, a manufacturer-specific folder "AAAA" is created in a "Digital Camera IMages (DCIM)" folder in a "root" folder. Then, each piece of still image data is stored in a file with the name, for example, "xxx00001.JPG" in the "AAAA" folder.

In contrast, as illustrated in (b) of FIG. 2, in the PC 2, an acquisition-application-specific folder "BBBB" is created in a "picture" folder in a "library" folder. Then, a folder "2012-04-18" indicating the date on which a still image is captured is created in the "BBBB" folder and each piece of still image data is stored in a file with the name, for example, "2012-04-18_xxx00001.JPG" in the "2012-04-18" folder. Specifically, in the PC 2, file names are used to which a character string indicating the date is added at the top of the file name that is used in the memory card.

A description will be given here by referring back to FIG. 1. The detecting unit 28 detects that a memory card, such as the built-in WLAN memory card 3, is inserted into the PC 2 and notifies the link unit 22 and the power supplying unit 29 of the insertion. If the power supplying unit 29 is notified by the detecting unit 28 indicating that the memory card, such as the built-in WLAN memory card 3, is inserted into the PC 2, the power supplying unit 29 starts supplying power to the memory card.

The built-in WLAN memory card 3 includes the WLAN unit 31, a file management unit 32, a storing unit 33, and the PC interface unit 34.

The WLAN unit 31 communicates by using a wireless LAN. In the embodiment, the WLAN unit 31 communicates with the WLAN unit 21 in the PC 2. The WLAN unit 31 includes an AP unit 311 that allows the WLAN unit 31 to function as an access point for wireless LAN communication and also includes an STA unit 312 that allows the WLAN unit 31 to function as a station (client machine) for wireless LAN communication.

The file management unit 32 manages a file stored in the storing unit 33. The file management unit 32 manages, for example, still image data by using the method illustrated in (a) of FIG. 2. The storing unit 33 stores therein, as a file, data, such as for still images and moving images. The PC interface unit 34 is an interface that performs wire communication with the MC interface unit 25 in the PC 2 when the built-in WLAN memory card 3 is inserted into the PC 2.

Figure 3:
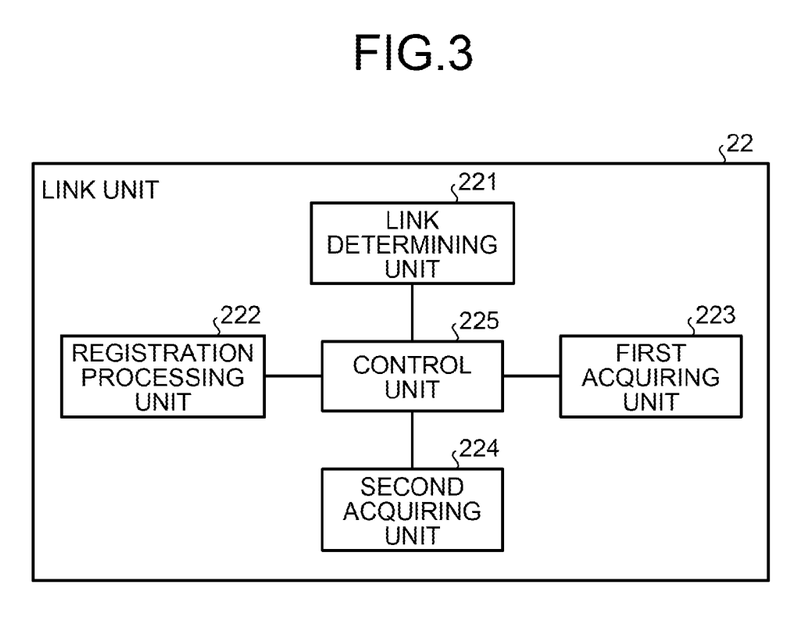
FIG. 3 is a functional block diagram illustrating the configuration of a link unit.

In the following, the configuration of the link unit 22 will be described. FIG. 3 is a functional block diagram illustrating the configuration of the link unit 22. As illustrated in FIG. 3, the link unit 22 includes a link determining unit 221, a registration processing unit 222, a first acquiring unit 223, a second acquiring unit 224, and a control unit 225.

The link determining unit 221 performs a control such that, when the built-in WLAN memory card 3 is inserted into the PC 2, the link unit 22 does not use a wireless LAN to acquire still images and moving images. Specifically, when the link determining unit 221 uses the wireless function to detect a built-in WLAN memory card, the link determining unit 221 determines whether there is a match between the SSID of the detected built-in WLAN memory card and the SSID of the built-in WLAN memory card 3 that is inserted into the PC 2. If the SSIDs match, it means the built-in WLAN memory card detected using the wireless function is the built-in WLAN memory card 3 inserted into the PC 2 and the link determining unit 221 consequently performs a control such that the link unit 22 does not acquire still images nor moving images by using a wireless LAN.

Specifically, if the SSIDs match, it means still images and moving images have already been acquired by the MC interface unit 25 when the built-in WLAN memory card 3 was inserted into the PC 2 and the link determining unit 221 consequently performs a control such that the still images and moving images are not acquired by using the wireless LAN.

As described above, when the built-in WLAN memory card 3 is inserted into the PC 2, the link determining unit 221 performs a control such that still images and moving images are not acquired using a wireless LAN. This makes it possible to prevent the still images and moving images from being acquired twice.

When the built-in WLAN memory card 3 is inserted into the PC 2 and if it has not been registered yet, the registration processing unit 222 registers, in accordance with an instruction from a user, the built-in WLAN memory card 3 as a target for link in the PC 2. Specifically, the registration processing unit 222 writes a service set identifier (SSID) and a password, which are used for wireless communication, in a specific file in the built-in WLAN memory card 3 and stores the SSID and the password in the PC 2.

Figure 4:
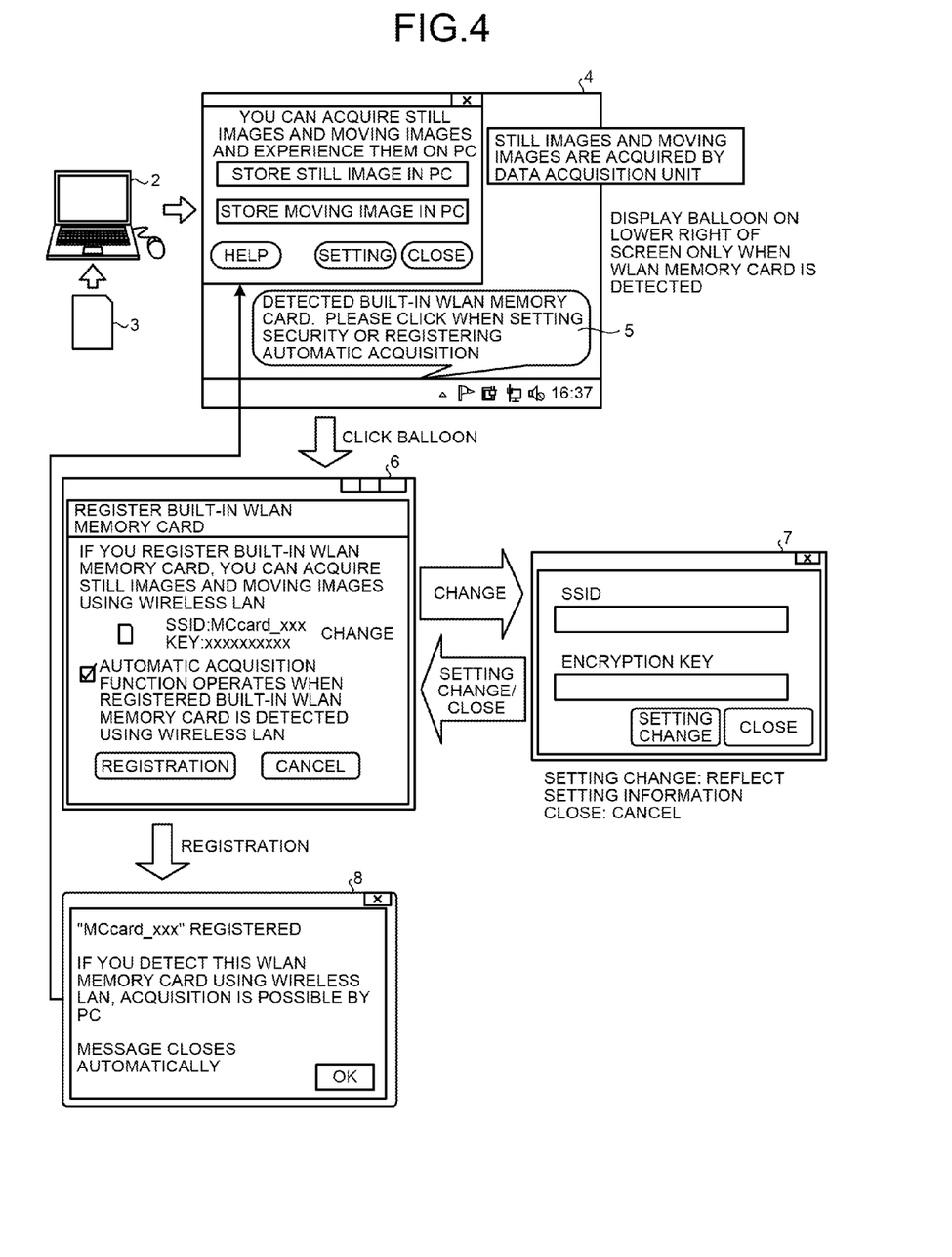
FIG. 4 is a schematic diagram illustrating a registration process performed on a built-in WLAN memory card by a registration processing unit.

FIG. 4 is a schematic diagram illustrating a registration process performed on the built-in WLAN memory card 3 by the registration processing unit 222. As illustrated in FIG. 4, if the PC 2 detects that the built-in WLAN memory card 3 is inserted, the PC 2 boots up the acquisition application and displays an acquisition screen 4 on which a still image and a moving image are displayed.

Then, the registration processing unit 222 notifies the user of the detection of the built-in WLAN memory card 3 by using a detection balloon display 5 that appears on the lower right of the screen and uses the detection balloon display 5 to query the user about security settings or the registration of the automatic acquisition.

When the user clicks the detection balloon display 5, the registration processing unit 222 displays a registration screen 6 related to the built-in WLAN memory card 3. The user sets up the automatic acquisition of the still images and moving images by using the registration screen 6. Then, the registration processing unit 222 displays a completion screen 8 that notifies the user that the setting of the automatic acquisition of the still images and moving images has been completed and then ends the registration process.

Furthermore, if a user instructs a change to be made to the setting of the SSID and an encryption key for the wireless LAN on the registration screen 6, the registration processing unit 222 displays a setting screen 7 and the user changes the setting of the SSID and the encryption key by using the setting screen 7.

A description will be given here by referring back to FIG. 3. The first acquiring unit 223 acquires, from a memory card such as the built-in WLAN memory card 3, still images and moving images by using the MC interface unit 25 and writes the acquired still image data and moving image data in the link data storing unit 27. Furthermore, when the first acquiring unit 223 acquires the still images and moving images from a memory card, the first acquiring unit 223 manages the file that stores therein the still image data and moving image data by using the same method performed by the data acquisition unit 26.

When the second acquiring unit 224 detects an AP of a registered built-in WLAN memory card by using the wireless function, the second acquiring unit 224 acquires still images and moving images from the built-in WLAN memory card by using the WLAN unit 21 and writes the acquired still image data and moving image data in the link data storing unit 27. Furthermore, when the second acquiring unit 224 acquires the still images and moving images from a built-in WLAN memory card, the second acquiring unit 224 manages the file that stores therein the still image data and moving image data by using the same method performed by the data acquisition unit 26.

However, when the built-in WLAN memory card 3 is inserted into the PC 2, the still images and moving images are acquired by the data acquisition unit 26 or the first acquiring unit 223. Consequently, the second acquiring unit 224 does not acquire the still images and moving images by using the WLAN unit 21.

As described above, when the built-in WLAN memory card 3 is inserted into the PC 2, the second acquiring unit 224 does not acquire the still images and moving images by using the WLAN unit 21. Consequently, it is possible to prevent the still images and moving images in the built-in WLAN memory card 3 from being acquired twice.

Furthermore, when the first acquiring unit 223 and the second acquiring unit 224 acquire still images and moving images from the built-in WLAN memory card 3, the file that stores therein still image data and moving image data is managed by using the same method as that performed by the acquisition application. Consequently, it is possible to prevent double management of the still images and moving images.

The control unit 225 is a processing unit that performs overall control of the link unit 22. Specifically, the control unit 225 moves control between functioning units or receives and transmits data between functioning units.

Figure 5:
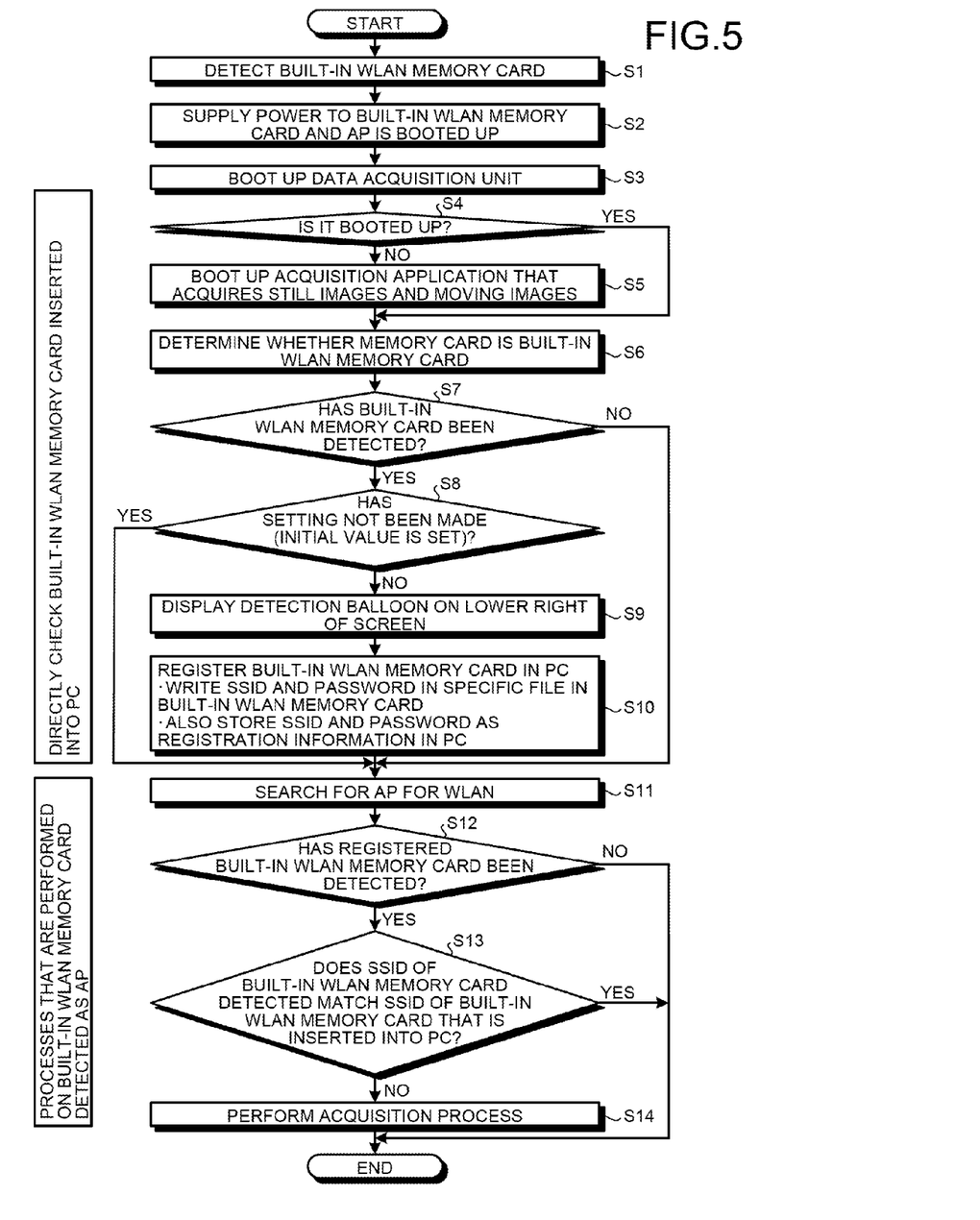
FIG. 5 is a flowchart illustrating the flow of a process performed, by a PC, when the built-in WLAN memory card is inserted.

In the following, a description will be given of the flow of a process performed by the PC 2 when the built-in WLAN memory card 3 is inserted. FIG. 5 is a flowchart illustrating the flow of a process performed, by the PC 2, when the built-in WLAN memory card 3 is inserted.

As illustrated in FIG. 5, if the detecting unit 28 detects the built-in WLAN memory card 3 (Step S1), the power supplying unit 29 supplies power to the built-in WLAN memory card 3 and then an AP of the built-in WLAN memory card 3 is booted up (Step S2).

Furthermore, the PC 2 boots up the data acquisition unit 26, i.e., an acquisition application (Step S3). Then, the link determining unit 221 determines whether the acquisition application is booted up (Step S4). If the acquisition application is not booted up, the first acquiring unit 223 boots up the acquisition application as an application that is used to acquire still images and moving images (Step S5). In contrast, if the acquisition application is booted up, the acquisition application acquires the still images and moving images. Then, the link determining unit 221 determines whether an inserted memory card is the built-in WLAN memory card 3 (Step S6).

Then, the link determining unit 221 determines whether a built-in WLAN memory card has been detected (Step S7). If the result of the determination is that a built-in WLAN memory card has not been detected (No at Step S7), the link determining unit 221 moves to Step S11.

In contrast, if a built-in WLAN memory card has been detected (Yes at Step S7), the link determining unit 221 determines whether the setting has not been made in the built-in WLAN memory card, i.e., an initial value is set in the built-in WLAN memory card (Step S8). If the result of the determination is that the setting has been made (Yes at Step S8), the link determining unit 221 moves to Step S11.

In contrast, if the setting has not been made in the built-in WLAN memory card (No at Step S8), the registration processing unit 222 displays the detection balloon display 5 indicating, on the lower right of the screen, that the built-in WLAN memory card has been detected (Step S9). If a user clicks the detection balloon display 5, the registration processing unit 222 registers the built-in WLAN memory card in the PC 2 (Step S10). Specifically, the registration processing unit 222 writes an SSID and a password in the specific file in the built-in WLAN memory card and stores the SSID and the password as registration information in the PC 2.

Thereafter, the link determining unit 221 searches for an AP for the WLAN (Step S11) and determines whether a registered built-in WLAN memory card has been detected (Step S12). If the result of the determination is that the registered built-in WLAN memory card has not been detected, the link unit 22 ends the process.

In contrast, if a registered built-in WLAN memory card has been detected, the link determining unit 221 determines whether the built-in WLAN memory card that has been detected by using a wireless function and the built-in WLAN memory card 3 that is inserted into the PC 2 are the same. Specifically, the link determining unit 221 determines whether the SSID of the built-in WLAN memory card that has been detected by using the wireless function matches the SSID of the built-in WLAN memory card 3 that is inserted into the PC 2 (Step S13).

If the result of the determination is that the SSID of the built-in WLAN memory card that has been detected by using the wireless function matches the SSID of the built-in WLAN memory card 3 that is inserted into the PC 2, it means the still images and moving images have already been acquired by the data acquisition unit 26 or the first acquiring unit 223 and the link unit 22 consequently ends the process. In contrast, if the SSID of the built-in WLAN memory card that has been detected by using a wireless function does not match the SSID of the built-in WLAN memory card 3 that is inserted into the PC 2, the second acquiring unit 224 acquires still images and moving images by using the WLAN unit 21 (Step S14).

The case in which the SSID of the built-in WLAN memory card that has been detected by using a wireless function does not match the SSID of the built-in WLAN memory card 3 that is inserted into the PC 2 corresponds to a case in which a built-in WLAN memory card other than that inserted into the PC 2 is detected.

As described above, if the SSID of the built-in WLAN memory card that has been detected by using a wireless function matches the SSID of the built-in WLAN memory card 3 that is inserted into the PC 2, the link determining unit 221 performs a control such that still images and moving images are not acquired using a wireless LAN. Accordingly, the link unit 22 can prevent the still images and moving images in the built-in WLAN memory card 3 from being acquired twice.

The processes at Steps S4 to S10 are the processes that directly check the built-in WLAN memory card 3 inserted into the PC 2. The processes at Steps S11 to S14 are the processes that are performed on the built-in WLAN memory card detected as an AP.

Figure 6:
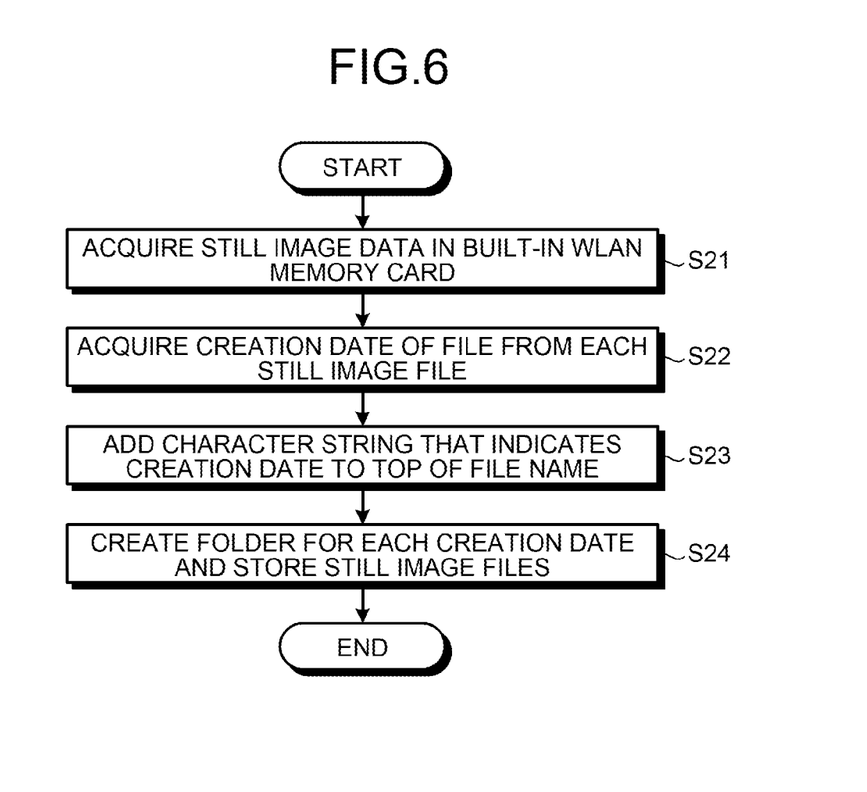
FIG. 6 is a flowchart illustrating the flow of an acquisition process performed by a second acquiring unit on a still image from the built-in WLAN memory card.

In the following, a description will be given of the flow of an acquisition process performed by the second acquiring unit 224 on still images from the built-in WLAN memory card. FIG. 6 is a flowchart illustrating the flow of an acquisition process performed by the second acquiring unit 224 on still images from the built-in WLAN memory card.

As illustrated in FIG. 6, the second acquiring unit 224 acquires still image data in the built-in WLAN memory card by using the WLAN unit 21 (Step S21). Then, the second acquiring unit 224 acquires, from each of still image files that store therein still image data, the creation dates of the files, i.e., the captured dates of still images (Step S22).

Then, the second acquiring unit 224 adds a character string that indicates a creation date to the top of a file name of each of the still image files (Step S23). Then, the second acquiring unit 224 creates, for each creation date, a folder in the acquisition application-specific folder in the "picture" folder in the "library" folder and stores the created still image files that were created on the creation date (Step S24).

However, if the same creation date folders are present in the acquisition-application-specific folder in the "picture" folder in the "library" folder, the second acquiring unit 224 stores the still image files that were created on the creation date in the existing folder.

As described above, when the second acquiring unit 224 acquires still image data in the built-in WLAN memory card by using the WLAN unit 21, the still image data are managed by the same management method as that performed by the acquisition application. Consequently, it is possible to prevent double management of the still image data.

Figure 7:
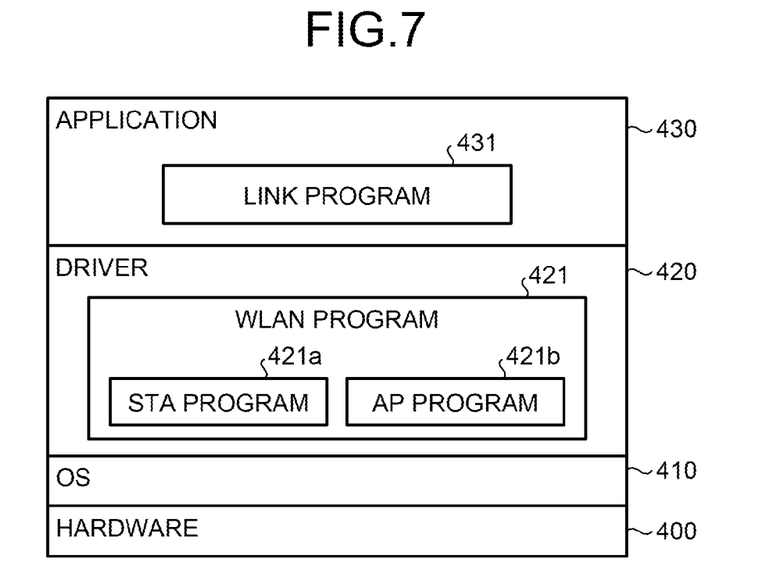
FIG. 7 is a block diagram illustrating the software configuration of the PC that is used to implement a link between the PC and the memory card.

In the following, a description will be given of the configuration of the software in the PC 2 used to implement a link between the PC 2 and the memory card. FIG. 7 is a block diagram illustrating the configuration of the software in the PC 2 used to implement a link between the PC 2 and the memory card.

As illustrated in FIG. 7, the software, in the PC 2, for implementing a link between the PC 2 and the memory card includes an OS 410, a driver 420, and an application 430. The OS 410, the driver 420, the application 430 implement a link process by cooperating with hardware 400.

The driver 420 includes a WLAN program 421. The WLAN program 421 executed by the PC 2 implements the function of the WLAN unit 21 illustrated in FIG. 1. Furthermore, the WLAN program 421 includes an STA program 421*a* and an AP program 421*b*. The STA program 421*a* and the AP program 421*b* executed by the PC 2 implement the function of the STA unit 212 and the AP unit 211 illustrated in FIG. 1.

The application 430 includes a link program 431. The link program 431 executed by the PC 2 implements the function of the link unit 22 illustrated in FIG. 1. By using the WLAN program 421, the link program 431 cooperates with another information communication device. Specifically, the link program 431 in the PC 2 executes the link process by linking with the built-in WLAN memory card.

Figure 8:
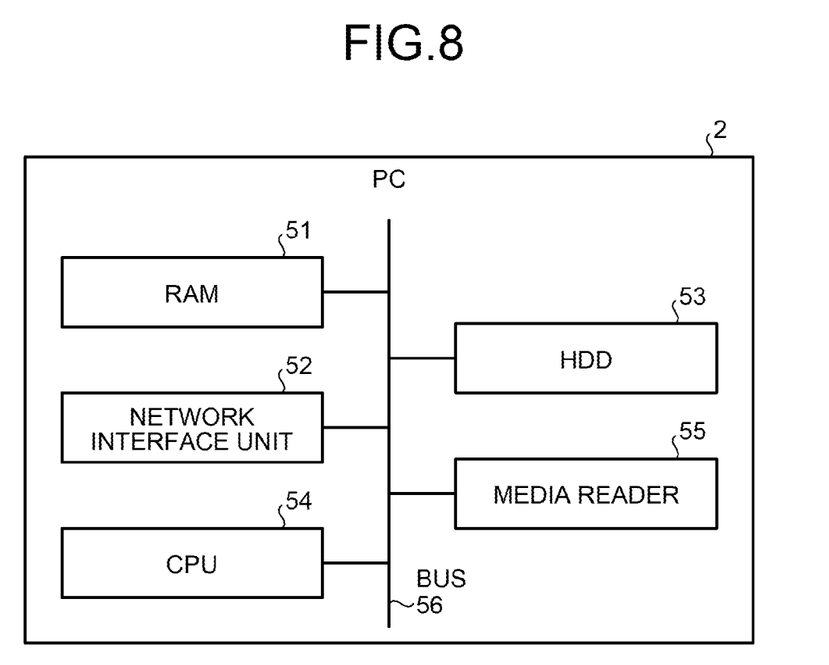
FIG. 8 a block diagram illustrating the hardware configuration of the PC.

In the following, the hardware configuration of the PC 2 will be described. FIG. 8 is a block diagram illustrating the hardware configuration of the PC 2. As illustrated in FIG. 8, the PC 2 includes a RAM 51, a network interface unit 52, an HDD 53, a CPU 54, a media reader 55, and a bus 56. The RAM 51, the network interface unit 52, the HDD 53, the CPU 54, and the media reader 55 are connected by the bus 56.

The HDD 53 stores therein a program, such as the link program 431, that implements the function of the link unit 22 illustrated in FIG. 1. Furthermore, the HDD 53 stores therein still image data, moving image data, and the like stored in the link data storing unit 27 illustrated in FIG. 1.

Then, the CPU 54 reads the link program 431 from the HDD 53 and loads the link program 431 in the RAM 51. Consequently, the link program 431 functions as a link process. Then, the link process appropriately loads, in an area of the RAM 51 allocated to the link process, information or the like that is read from the HDD 53 and executes various pieces of data processing depending on the loaded data.

Even when a program, such as the link program 431, is not stored in the HDD 53, the media reader 55 reads the program, such as the link program 431, from a medium that stores therein the program. An example of the media reader 55 includes a CD-ROM or an optical disk device.

The network interface unit 52 is a device that is connected to an external device via a network and that is capable of wireless communication. The network interface unit 52 implements the function of the WLAN unit 21 illustrated in FIG. 1.

The link program 431 described above may also be stored in another computer (or a server) that is connected to the PC 2 via a public circuit, the Internet, a LAN, a wide area network (WAN), or the like. In such a case, the PC 2 reads the link program 431 from the other computer or the like via the network interface unit 52 and implements the link program 431 in the HDD 53.

As described above, in the embodiment, when the built-in WLAN memory card 3 is inserted into the PC 2, the link unit 22 prevents still images and moving images from being acquired using a wireless LAN. Consequently, the link unit 22 can prevent the still images and moving images from being acquired twice.

Furthermore, in the embodiment, when the first acquiring unit 223 and the second acquiring unit 224 acquire still images and moving images in the built-in WLAN memory card, the files that store therein still image data and moving image data are managed by using the same method as that performed by the acquisition application. Consequently, it is possible to prevent the double management of the still images and moving images in the built-in WLAN memory card.

Furthermore, in the embodiment, a description has been given of a case in which the built-in WLAN memory card 3 is inserted into the PC 2; however, the present invention is not limited thereto. For example, the embodiment may also be used in a case in which, for example, a built-in WLAN USB storage device is connected using a USB cable.

According to an aspect of the embodiment, an advantage is provided in that it is possible to prevent still images and moving images in a built-in WLAN memory card from being acquired twice.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer readable storage medium having stored therein a link program causing a computer to execute a process comprising:

first determining, when a storage device having a built-in wireless communication function has been detected by using wireless communication, whether registration of automatic acquisition of data stored in the storage device has been performed;

second determining, when the first determining determines that the registration has been performed, whether the storage device having the built-in wireless communication function booted up due to the computer starting to supply power has been detected; and controlling, when it is determined at the second determining that the storage device, in which the built-in wireless communication function is booted up due to the computer starting to supply power, has been detected, such that data in the storage device is not acquired using wireless communication.

2. The non-transitory computer readable storage medium according to claim 1, wherein the second determining includes determining by comparing an identifier related to the wireless communication for the storage device that has been detected by using the wireless communication with an identifier related to the wireless communication for the storage device, in which the wireless communication function is booted up due to the computer starting to supply power.

3. The non-transitory computer readable storage medium according to claim 1, further comprising:

third determining, when the computer starts to supply power to the storage device having a built-in wireless communication function, whether an application that acquires data stored in the storage device is booted up; and acquiring the data by using a wired connection when the application is not booted up.

4. The non-transitory computer readable storage medium according to claim 1, further comprising:

registering, when the first determining determines that the registration has not been performed, the automatic acquisition of the data stored in the storage device by using wireless communication.

5. An information processing apparatus comprising:

a memory; and a processor coupled to the memory, wherein the processor executes a process comprising:

first determining, when a storage device having a built-in wireless communication function has been detected by using wireless communication, whether registration of automatic acquisition of data stored in the storage device has been performed;

second determining, when the first determining determines that the registration has been performed, whether the storage device having the built-in wireless communication function booted up due to the computer starting to supply power has been detected; and controlling, when it is determined at the second determining that the storage device, in which the built-in wireless communication function is booted up due to the computer starting to supply power, has been detected, such that data in the storage device is not acquired using wireless communication.

* * * * *